April 13, 1943.　　　F. G. BLOCH　　　2,316,391
TEMPERATURE MEASURING DEVICE
Filed Oct. 15, 1941
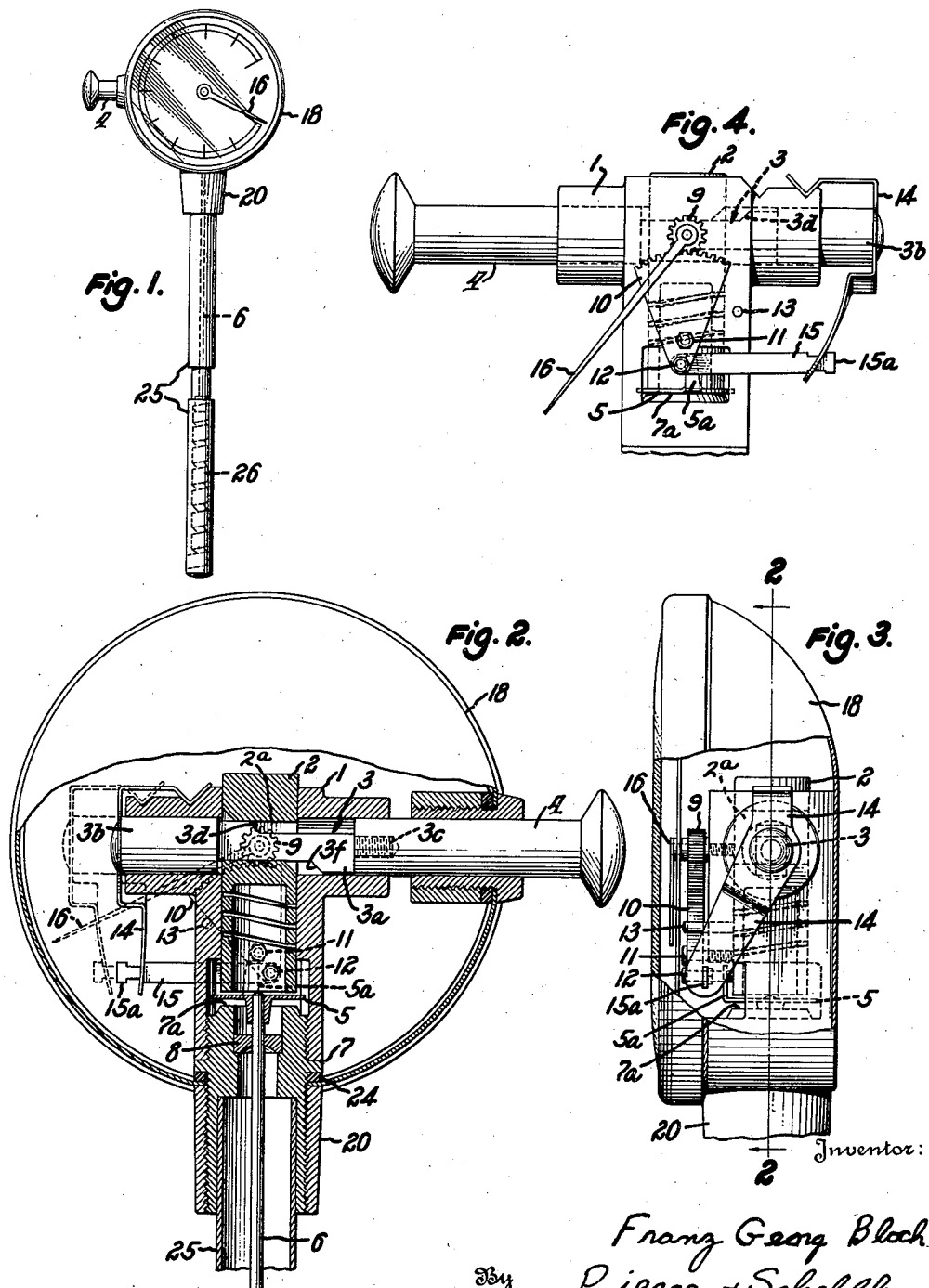
Inventor:
Franz Georg Bloch
By Pierce + Scheffler
Attorneys.

Patented Apr. 13, 1943

2,316,391

UNITED STATES PATENT OFFICE

2,316,391

TEMPERATURE MEASURING DEVICE

Franz Georg Bloch, Le Sentier, Vaud, Switzerland

Application October 15, 1941, Serial No. 415,119
In Switzerland December 7, 1940

1 Claim. (Cl. 73—367)

The present invention relates to means for indicating the movement of a measuring element upon any desired scale independently of the torque of the measuring element, and it is particularly directed to a bimetallic thermometer comprising an indicating mechanism actuated independently of the torque of the temperature-sensitive element.

It has been proposed to provide bimetallic thermometers with indicating mechanism independent of the temperature-sensitive element and with a stop-device co-ordinated with an energy accumulating system, with the aid of which the temperature-sensitive element is arrested in any of its positions, and by transmission of the relative motion between this arrested position and a reference point the measurement is carried over to a pointer and scale. The arrangement of the energy accumulating system requires a complicated construction of the measuring apparatus, whereby sources of error are introduced, which influence the certainty of control and the exactness of the result.

A principal object of the present invention is to provide a simple and compact mechanism whereby the scale position of an indicating element may be accurately correlated with the position of a measuring element independently of the torque of the measuring element.

The principles of the invention are typically embodied in a bimetallic thermometer which differs fundamentally from existing devices in that the energy required for the arresting means, as well as that required for the motion of the transmission system is delivered directly thereto by means of an element actuated by the stop-device, so that the intermediate connection of an energy accumulating system is done away with. The simplification thus brought about in the manufacture of the instrument and the resulting certainty of control afford a considerable advantage over the hitherto known devices.

The invention will be more particularly described with reference to the accompanying drawing in which:

Fig. 1 is an elevation of a bimetallic thermometer embodying the principles of the invention;

Fig. 2 is an enlarged sectional view of the instrument as seen on line 2—2 of Fig. 3;

Fig. 3 is an enlarged fragmentary side view of the indicating mechanism (from the left of Fig. 2); and Fig. 4 is an enlarged fragmentary front view of the indicating mechanism as seen when removed from the casing.

The bimetallic element 26 is connected at its upper end with shaft 6 and at its lower end with casing 25. Connected to the upper end of shaft 6 is a damping disc 5 having a contact arm 5a. In the nipple 7 which, together with housing 18 and packing 24 is screwed into bushing 20, there is disposed a bearing 8 in which the shaft 6 is carried. A T-shaped member 1 is screwed onto the upper portion of nipple 7. This member 1 has a vertical bore in which sleeve 2 is slidably mounted and a horizontal bore in which rod 3 is slidably mounted, rod 3 likewise passing through the upper end of slide 2. Rod 3 has a rectangular offset portion 3a and a round portion 3b, as well as a threaded extension 3c by which it is fastened to push member 4. The rectangular portion 3a of rod 3 passes through a slot 2a in sleeve 2. The rod 3 has bevelled offset portions 3d and 3f, so that by moving the rod 3 to the right the sleeve 2 is pressed downward into contact with damping disc 5. The lower portion of sleeve 2 is in the form of a spring so that it may be compressed. At the end of rod 3 there is attached a resilient member 14, the lower end of which engages the collar 15a of drawbar 15. This drawbar 15 is pivotally attached to member 10 by means of a bolt 12. Member 10 is pivotally mounted on bolt 11 which is attached to the T-piece 1. The member 10 by means of its toothed edge engages a cog wheel 9, which is connected with pointer 16. The zero position of member 10 is fixed by bolt 13 which is attached to the T-piece. The operation of the thermometer is as follows:

The temperature which acts upon element 26 causes a rotation of the same, whereby a rotation of shaft 6 and of disc 5 is produced, so that the contact arm 5a of disc 5 assumes a definite position. This position of contact arm 5a is arrested by sliding rod 3 inward by means of pushbutton 4 so that sleeve 2 is pressed downward and by its lower end presses disc 5 against the damping surface 7a of nipple 7. Resilient member 14 is simultaneously brought to the final stop position. In this way its lower end exerts a tractive effort on drawbar 15. The movement of drawbar 15 is transmitted to member 10 and is limited by contact of bolt 12 against contact arm 5a of disc 5. The movement of member 10 is thus dependent upon the position of contact arm 5a and therefore upon the rotation of shaft 6. The movement of member 10 is transmitted to pointer 16, which indicates the temperature. By pulling button 4 out, the rod 3 returns to its starting position. The sleeve 2 is forced upward and releases the damping disc, and resilient member 14 forces member 10 and pointer 16 to the zero position. Because of the conversion relationship between member 10 and the pointer, the movement of contact arm 5a is correspondingly amplified. The resilient member 14 in its initial as well as its final position is under an elastic deflection and thus exerts the pressure necessary for exact measurements upon the connecting bolt 12 in the measuring position as well as in the zero position. The other end of resilient member 14 is suitably constructed to act as a detent for both stop positions. The stops for this detent are themselves arranged on T-piece 1 so that the push button is secured in both end positions.

It will clearly appear that the invention is not limited to the described constructional details, but that various embodiments and modifications may be made without departing from the novel principles of the invention as defined in the appended claim.

I claim:

A thermometer comprising a bimetallic temperature-responsive element of low torque, an indicating element, a brake member carried by said bimetallic element, an arresting member mounted for sliding movement into and out of contact with said brake member, a manually operable member mounted for sliding movement transversely of the path of movement of said arresting member and adapted to positively move said arresting member into and out of contact with said brake member, means for releasably holding said manually operable member in positions corresponding to arresting and non-arresting position of said arresting member, means including a resilient member connecting said manually operable member with said indicating element for imparting motion to said indicating element upon operation of said manually operable member to move said arresting member into arresting position and means including a stop carried by said bimetallic element for limiting the amount of movement of said indicating element in accordance with the position at which the bimetallic element is arrested.

FRANZ GEORG BLOCH.